US005204690A

United States Patent [19]

Lorenze, Jr. et al.

[11] Patent Number: 5,204,690

[45] Date of Patent: Apr. 20, 1993

[54] INK JET PRINTHEAD HAVING INTERGRAL SILICON FILTER

[75] Inventors: Robert V. Lorenze, Jr., Webster; James F. O'Neill, Penfield, both of N.Y.

[73] Assignee: Xerox Corporation, Stamford, Conn.

[21] Appl. No.: 724,297

[22] Filed: Jul. 1, 1991

[51] Int. Cl.[5] .......... B41J 2/05; C03C 15/00; C03C 25/06

[52] U.S. Cl. .......... 346/1.1; 346/140 R; 156/644; 156/647; 156/657; 156/661.1

[58] Field of Search .......... 346/1.1, 140 R; 156/644, 647, 657, 654, 653, 661.1; 210/488, 490, 348

[56] References Cited

U.S. PATENT DOCUMENTS

| | | | |
|---|---|---|---|
| 4,106,976 | 8/1978 | Chiou et al. | 156/644 |
| 4,169,008 | 9/1979 | Kurth | 156/600 |
| 4,417,946 | 11/1983 | Bohlen et al. | 156/306 |
| 4,455,192 | 6/1984 | Tamai | 156/628 |
| 4,589,952 | 5/1986 | Behringer et al. | 156/628 |
| 4,639,748 | 1/1987 | Drake et al. | 346/140 R |
| 4,733,823 | 3/1988 | Waggener et al. | 239/601 |
| 4,864,329 | 9/1989 | Kneezel et al. | 346/140 R |
| 5,124,717 | 6/1992 | Campanelli et al. | 346/1.1 |

*Primary Examiner*—Benjamin R. Fuller
*Assistant Examiner*—Alrick Bobb
*Attorney, Agent, or Firm*—Robert A. Chittum

[57] ABSTRACT

An ink jet printhead having an integral silicon filter over the printhead ink inlet is disclosed. The filter is produced by orientation dependent etching during printhead fabrication. The individual printheads are obtained by a sectioning operation which cuts aligned and bonded channel and heater wafers into a plurality of printheads. The channel wafer is orientation dependent etched from one side of a (100) silicon wafer through a patterned etch resistant mask layer to produce the plurality of reservoir recesses, each having a predetermined depth and floor thickness, and a plurailty of sets of parallel ink channel grooves, one set of channel grooves for each reservoir recess. The etch resistant mask layer on both sides of the channel wafer are removed and a second etch resistant mask layer is deposited thereon. The second mask layer on the side opposite the one with the channel grooves and reservoir recesses are patterned to produce a plurality of patterns of filter pore vias in alignment with the bottoms of the reservoir recesses. The printhead filters are produced by a second orientation dependent etching step of the channel wafer and prior to bonding to the heater wafer.

10 Claims, 4 Drawing Sheets

INK JET PRINTHEAD HAVING INTERGRAL SILICON FILTER

BACKGROUND OF THE INVENTION

1. Field of the Invention

This invention relates to drop-on-demand ink jet printheads and more particularly, to a thermal ink jet printhead having an integral silicon filter over its ink inlet and process for fabricating the printhead with such filter.

2. Description of the Prior Art

A typical thermally actuated drop-on-demand ink jet printing system uses thermal energy pulses to produce vapor bubbles in an ink-filled channel that expels droplets from the channel orifices of the printing system's printhead. Such printheads have one or more ink-filled channels communicating at one end with a relatively small ink supply chamber and having an orifice at the opposite end, also referred to as the nozzle. A thermal energy generator, usually a resistor, is located within the channels near the nozzle at a predetermined distance upstream therefrom. The resistors are individually addressed with a current pulse to momentarily vaporize the ink and form a bubble which expels an ink droplet. A meniscus is formed at each nozzle under a slight negative pressure to prevent ink from weeping therefrom.

U.S. Pat. No. 4,589,952 to Behringer et al discloses a method of making trenches having substantially vertical sidewalls in a silicon substrate using a three-level mask comprising a thick photoresist layer, a silicon nitrite layer, and a thin photoresist layer. Openings are formed in the thin photoresist layer and silicon nitrite layer by reactive ion etching in $CF_4$. The openings are continued through the thick photoresist by etching in an atmosphere containing oxygen. The exposed surface of the silicon substrate is then etched in a $CF_4$ atmosphere containing a low concentration of fluorine. Also disclosed is a method of making an electron beam transmissive mask wherein the openings are made using a three level mask and reactive ion etching of silicon using the etching technique of this invention.

U.S. Pat. No. 4,417,946 to Bohlen et al discloses a mask for structuring surface areas and a method of manufacture of such mask. The mask includes at least one metal layer with apertures which define the mask pattern and a semiconductive substrate for carrying the metal layer. A semiconductor substrate has through holes that correspond to the mask pattern. The through holes in the semiconductor substrate extend from the metal covered surface on the front to at least one tub shaped recess which extends from the other back surface into the semiconductor substrate. Holes are provided in a surface layer in the semiconductor substrate. The surface layer differs in its doping from the rest of the substrate and the holes which are provided in the surface layer have lateral dimensions larger than the apertures in the metal layer so that the metal layer protrudes over the surface layer.

U.S. Pat. No. 4,639,748 to Drake et al discloses an ink jet printhead having an internal filtering system and fabricating process therefor. Each printhead is composed of two parts aligned and bonded together. One part contains a linear array of heating elements and addressing electrodes on one surface. The other part has a parallel array of elongated recesses for use as ink channels and a common ink supplying manifold recess in communication with the ink channels. The manifold recess contains an integral closed wall defining a chamber with an ink-fill hole. Small passageways are formed in the internal chamber walls to permit passage of ink therefrom into the manifold. Each of the passageways have smaller cross-sectional flow areas than the nozzles to filter the ink, while the total cross-sectional flow area of the passageways is larger than the total cross-sectional flow areas of the nozzles.

U.S. Pat. No. 4,864,329 to Kneezel et al discloses a thermal ink jet printhead having a flat filter placed over the inlet thereof by a fabrication process which laminates a wafer size filter to the aligned and bonded wafers containing a plurality of printheads. The individual printheads are obtained by a sectioning operation, which cuts through the two or more bonded wafers and the filter. The filter may be a woven mesh screen or preferably an electroformed screen with predetermined pore size. Since the filter covers one entire side of the printhead, a relatively large contact area prevents delamination and enables convenient leak-free sealing.

U.S. Pat. No. 4,169,008 to Kurth discloses a process for producing uniform nozzle orifices for an ink jet printhead, wherein holes are anisotropically etched through a silicon wafer. To overcome the effect of variation in thickness of the wafer on the through holes, the wafer is masked on both sides, photopatterned and deeply etched on its reverse side, then etched on its obverse side to create uniformly sized nozzles therein.

U.S. Pat. No. 4,106,976 to Chiou et al. discloses a method of manufacturing an ink jet nozzle for a printhead, wherein a silicon wafer is masked on both sides with an inorganic membrane or layer such as silicon dioxide, silicon nitride, glassy materials and the like. The mask on the reverse side is patterned, and anisotropically etched to produce through holes therein which expose the membrane mask on the obverse side. The membrane mask on the obverse side is patterned and precisely etched to form nozzles. This also overcomes the effect of etched nozzle sizes caused by variation in wafer thickness.

U.S. Pat. No. 4,455,192 to Tamai discloses a method of manufacturing a multi-nozzle ink jet printhead wherein a single crystal silicon substrate or plate is masked and an etch stop layer is implanted therein and a second single crystal silicon substrate is then grown onto the first over the patterned etch stop layer. The second silicon substrate is masked and anisotropically etched, so that a through recess is formed in the second substrate exposing the etch stop and the first substrate is through etched in areas without the etch stop to form nozzles therein.

U.S. Pat. No. 4,733,823 to Waggener et al. discloses the use of an etch stop layer of diffused phosphorous in the obverse surface of a silicon substrate and then coating both surfaces with an etch resistant material. The etch resistant material on the reverse side is patterned and anisotropically etched to produce recesses having the etch stop layer as a relatively thin floor. The etch stop layer is patterned to form nozzles therein.

One problem associated with thermal ink jet technology is the sensitivity of ink droplet directionality to particulates in the ink. Print quality is directly related to accurate placement of the ink droplets on a recording medium and droplet directionality determines the accuracy of the ink droplet placement. It has been demonstrated that higher print quality is achieved with particulate-free ink sources and the degree of particulate-free ink is related to how close the final filtration of the ink is to the ink jet printhead. One source of particulate contamination is the manufacturing environment itself. At least a partial solution to particulate-induced misdirectionality problems is to construct the entire transducer structure in a clean environment. However, complete particle-free environments are not practical. This invention also solves the problems of particle contamination during the fabrication of an ink jet printhead.

SUMMARY OF THE INVENTION

It is an object of the present invention to provide an ink jet printhead having an ink supply inlet having a filter integral therewith and method of fabrication therefor.

It is another object of the invention to provide an integral filter over the inlet of the printhead by a two step orientation dependent etching (ODE) process for a silicon substrate, wherein the first ODE step is timed to produce a plurality of channel grooves and an associated reservoir recess having a relatively thin floor. The etched grooves and reservoir recess are protected with an etch resistant mask layer and the opposite side is etched through a patterned mask to produce a filter in the reservoir recess floor.

In the present invention, a plurality of ink jet printheads with integral filters are fabricated from two (100) silicon wafers. A plurality of sets of heating elements and their individual addressing electrodes are formed on the surface of one of the wafers and a corresponding plurality of sets of parallel channel grooves, each channel groove set communicating with a recessed reservoir, are formed in a surface of the other wafer. The two wafers are aligned and bonded together and individual printheads are obtained by a sectioning operation which cuts the mated wafers into a plurality of printheads. The integral filter is formed in the channel wafer during a second etching step after it has been anisotropically etched to form the plurality of sets of channel grooves and reservoir recesses.

Specifically, this invention relates to an ink jet printhead having an ink inlet with an integral filter to prevent contaminates from entering the printhead either during subsequent fabrication steps or during a printing mode by contaminates entrained in the ink. The printhead comprises first and second substrates, each having first and second opposing surfaces. The first surface of the first substrate has a linear array of heating elements and associated addressing electrodes formed thereon, and the first surface of the second substrate has a reservoir recess with a bottom floor of predetermined thickness and a parallel set of elongated grooves adjacent thereto. The grooves have opposing ends, one end opening through an edge of the second substrate, after dicing, with the other end being adjacent the reservoir recess. The reservoir recess and the grooves are etched through vias patterned in an etch resistant mask layer on the first surface of the second substrate, while the second surface thereof is concurrently being prevented from being etched by an etch resistant mask layer. A reservoir recess floor is formed by stopping the etching process within a predetermined time period, and after cleaning, removing the etch resistant mask layer, and covering both sides of the second substrate with a second etch resistant mask layer, the second mask layer on the second surface of the second substrate is etched to form a pattern of openings of predetermined size for use as an inlet having an integral filter. While the pattern of openings are being produced by etching through vias patterned in the second etch resistant mask layer on the second surface of the second substrate to produce the integral filter, the reservoir recess and set of grooves are prevented from being etched by the second etch resistant mask layer covering the first surface of the second substrate. The first surface of the first substrate having the heating elements and addressing electrodes are aligned and bonded to the first surface of the second substrate having the reservoir recess and set of grooves, after the second etch resistant mask layer on both sides thereof is removed, so that each groove serves as a capillary-filled channel and has one of the heating elements within and spaced a predetermined distance from the groove open ends that serve as droplet emitting nozzles, and the reservoir recess serves as a reservoir of ink from which the channels are filled. A patterned thick film polymeric layer sandwiched between the two substrates provides one of the means for placing the grooves into communication with the reservoir recess. Other examples for placing the channels into communication with the reservoir are dicing and etching. Ink is supplied at a predetermined pressure to the reservoir inlet with the integral filer, so that ink travels through the integral filter and is filtered thereby as it flows into the reservoir and then into the channels. A meniscus is formed at the nozzles, which, in combination with the ink pressure, prevents ink from weeping therefrom. Electrical pulses are selectively applied to the heating elements through the addressing electrodes to produce momentary vapor bubbles in the ink in contact with the heating elements to eject ink droplets from the nozzles.

In addition to filtering contamination from the ink and ink supply system during printing, the integral filter also keeps dirt and other contamination from entering the normally large ink inlets during printhead assembly. The foregoing features and objects will become apparent from a reading of the following specification in conjunction with the drawings, wherein like parts have the same index numerals.

DESCRIPTION OF THE PREFERRED EMBODIMENT

Figure 1:
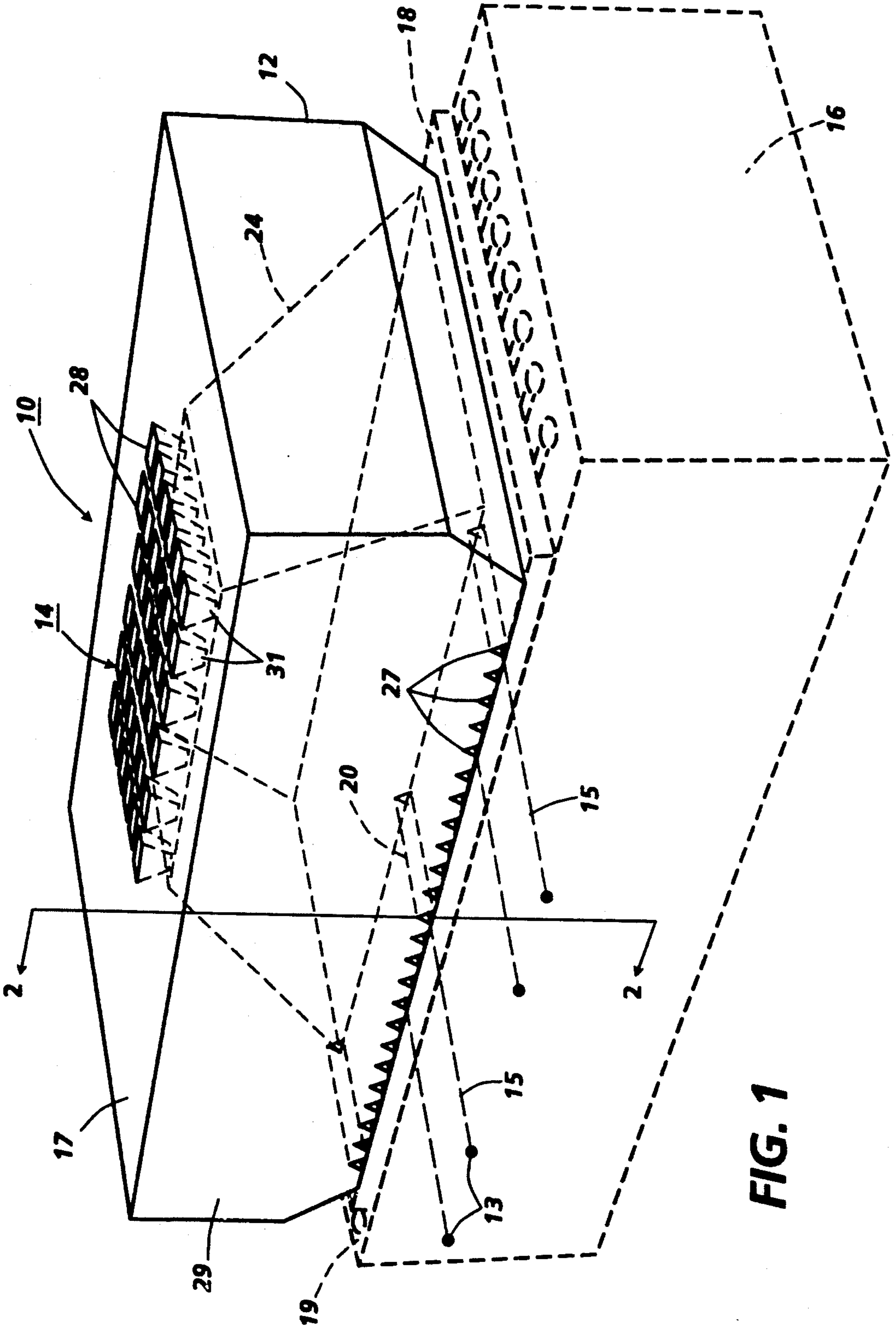
FIG. 1 is a partially shown enlarged isometric view of a single printhead having the integral filter of the present invention and showing the ink droplet emitting nozzles.
Figure 2:
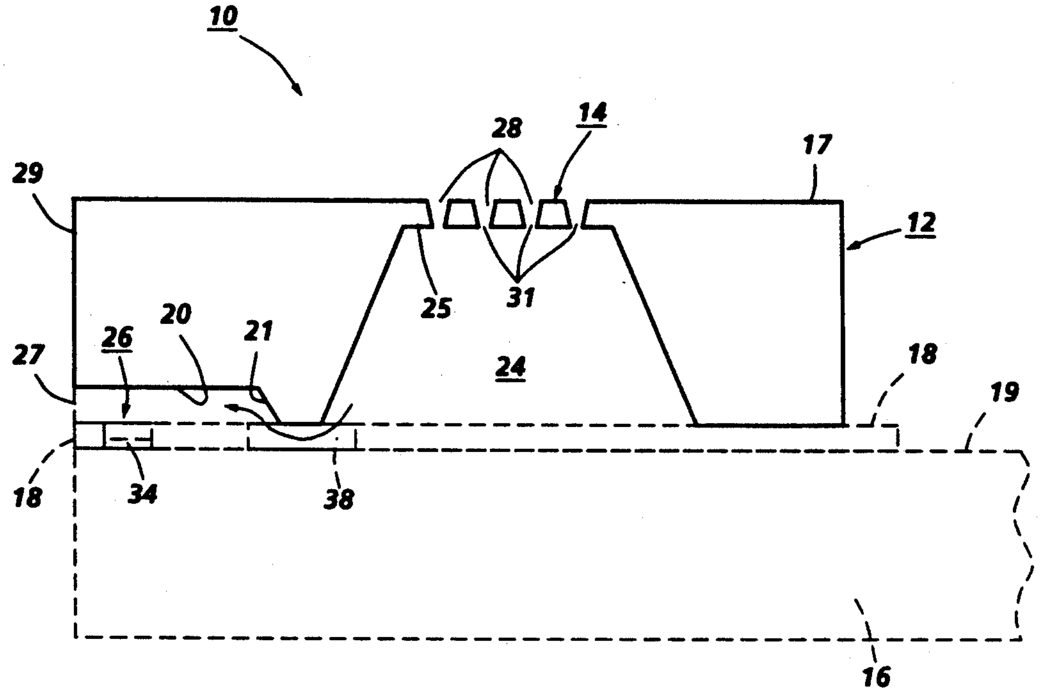
FIG. 2 is a cross-sectional view of the printhead as viewed along view line 2—2 of FIG. 1.

In FIGS. 1 and 2, a thermal ink jet printhead 10 of the present invention is shown comprising channel plate 12 with integral filter 14 and heater plate 16 shown in dashed line. A patterned thick film layer 18 is shown in dashed line having a material such as, for example, Riston®, Vacrel®, or polyimide, and is sandwiched between the channel plate and the heater plate. As disclosed in U.S. Pat. No. 4,774,530 to Hawkins and incorporated herein by reference in its entirety, the thick film layer is etched to remove material above each heating element 34, thus placing them in pits 26, and to remove material between the closed ends 21 of ink channels 20 and the reservoir 24 forming trench 38 in order to place the channels into fluid communication with the reservoir. For illustration purposes, droplets 13 are shown following trajectories 15 after ejection from the nozzles 27 in front face 29 of the printhead.

Referring to FIG. 1, the printhead comprises a channel plate 12 that is permanently bonded to heater plate 16 or to the patterned thick film layer 18 optionally deposited over the heating elements and addressing electrodes on the top surface 19 of the heater plate and patterned as taught in the above-mentioned U.S. Pat. No. 4,774,530. The channel plate is silicon and the heater plate may be any electrically insulative or semiconductive material as disclosed in the U.S. Pat. No. Re. 32,572 to Hawkins et al. The present invention is described for an edgeshooter type printhead, but could readily be used for a roofshooter configured printhead (not shown) as disclosed in U.S. Pat. No. 4,864,329 to Kneezel et al, wherein the ink inlet is in the heater plate, so that the integral filter of the present invention could be fabricated in an identical manner in the heater plate inlet as in the channel plate. The description of FIGS. 8 and 9 of U.S. Pat. No. 4,864,329 is herein incorporated by reference.

Channel plate 12 of FIG. 1 contains an etched recess 24, shown in dashed line, in one surface which, when mated to the heater plate 16, forms an ink reservoir. A plurality of identical parallel grooves 20, shown in dashed line and having triangular cross sections, are etched in the same surface of the channel plate with one of the ends thereof penetrating the front face 29 thereof after dicing. The other closed ends 21 (FIG. 2) of the grooves are adjacent the recess 24. When the channel plate and heater plate are mated, the groove penetrations through edge 29 produce the orifices or nozzles 27 and the grooves 20 serve as ink channels which connect the reservoir with the nozzles. The bottom 25 of the reservoir in the channel plate, shown in FIG. 2, is about 5 to 100 μm thick, with the preferred thickness being about 25 μm, and has a pattern of holes 28 anisotropically etched therethrough to provide means for filtering ink as it enters the reservoir from an ink supply source (not shown). The anisotropically etched pattern of holes are about 50×50 μm in size at the upper surface 17 of the channel plate 12 and taper inwardly along the {111} crystal plane toward a pyramidal apex, penetrating the floor 25 in openings 20×20 μm in size. The holes 28 are on about 50–100 μm center-to-center spacing for anisotropically etched openings in a floor thickness of about 1 mil or 25 μm. Since the holes are about one half to three quarters the cross-sectional areas of the nozzles, the pattern of holes functions as an inlet with an integral filter 14. Filter 14 of the present invention has been fabricated, as discussed later, by photodelineating a pattern of pyramidally shaped recesses 28 in the upper surface 17 of channel plate 12 which penetrate the reservoir floor producing apertures or pores 31 therein having a predetermined size in the range of 10–30 μm square and located in an area equal to and in alignment with the bottom 25 of the reservoir 24. In another embodiment, the upper surface 17 of the channel plate 12 has the pyramidal recesses equally spaced throughout the entire surface (not shown), so that alignment with the reservoir recess 24 is not necessary.

In addition to filtering out contamination from the ink and ink supply system during printing, the filter also keeps dirt and other debris from entering the relatively large inlets during printhead assembly. In this way, it is possible to use less stringently clean and, therefore, less expensive assembly rooms for printhead manufacture, after the etched channel plate has been aligned and bonded to the heater plate. Operations up through assembly of the bonded channel and heater wafers will need to occur in a clean room or under a clean hood, while subsequent operations can compromise somewhat on cleanliness.

Figure 3A:
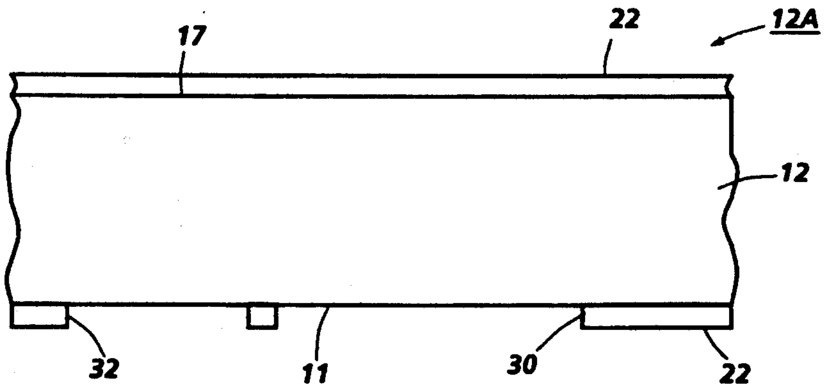
FIGS. 3A-3E show partial cross-sectional views of the channel plate fabricating steps which include the fabrication of the integral filter.
Figure 3B:
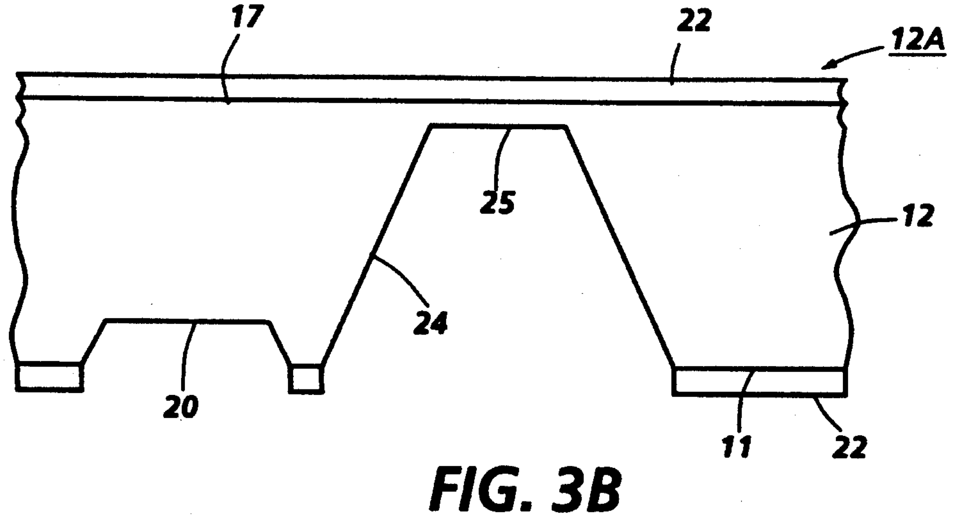

The fabricating process for the silicon channel plate 12 having an ink inlet with integral filter is shown in FIGS. 3A–3E, each being partial, cross-sectional views of a (100) silicon wafer 12A and showing substantially only one of a plurality of channel plates 12 subsequently diced therefrom. After the wafer is chemically cleaned, an etch resitant mask layer such as a pyrolytic CVD silicon nitride layer 22 is deposited to a thickness of about 1,000 Å on both top and bottom sides; 17 and 11 respectively. In FIG. 3A, the silicon nitride layer 22 on the bottom side 11 of the wafer (and channel plate) is photolithographically patterned to form a relatively large rectangular via 30 and a set of elongated, parallel vias 32. As disclosed in the above-mentioned reissue patent to Hawkins and shown in FIG. 3B, a potassium hydroxide (KOH) or other anisotropic etchant is used to etch the bottom surface 11 of the wafer 12A and form the channel grooves 20 and reservoir recess 24. The reservoir recess is etched deeply into the wafer to provide a recess about 400 to 495 μm deep in a 20 mil thick wafer 12A. Recess 24 thus has a bottom floor 25 that has a thickness between the recess bottom and the top surface of the wafer of about 5 to 100 μm.

After the sets of parallel, elongated channel grooves and associated reservoir recesses are anisotropically etched, the etching being timed to prevent the reservoir recesses from exceeding the desired depth, the etched wafer is removed from the etch bath, cleaned, and the etch resistant mask layer 22 removed. The desired reservoir recess depth is achieved in about two and three quarters hours to about three and one half hours in the anisotropic etchant, generally 30 weight percent KOH at 95° C.

Figure 3C:
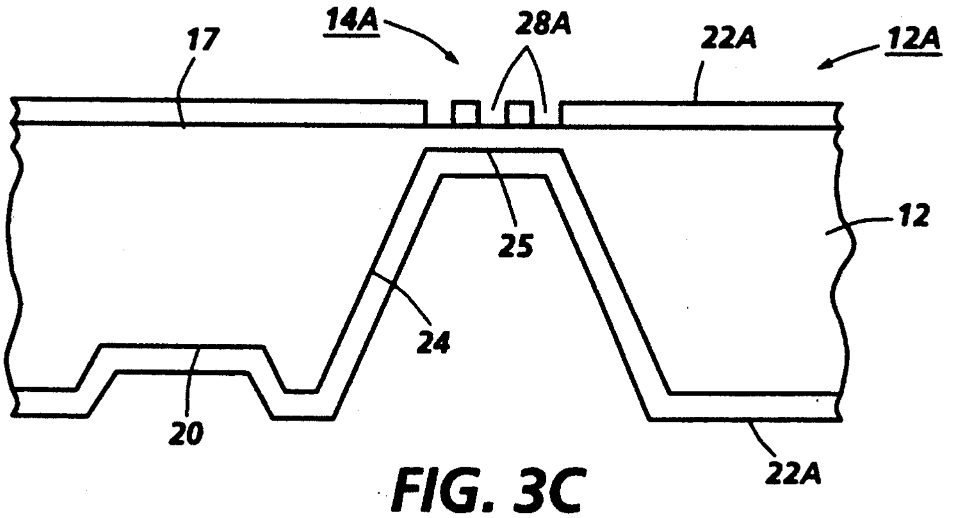

Once the etched wafer has been stripped of its etch resistant mask layer, a second etch resistant mask layer 22A is deposited on both sides. A photoresist layer (not shown) is applied on the top mask layer 22A residing on the top surface 17 of wafer 12A. The photoresist layer is patterned to form sets of vias having approximately 50×50 μm square openings on 50–100 μm centers. In one embodiment, each set of vias reside in a location equal to and aligned with the reservoir recess floor 25. In a second embodiment (not shown), the vias are patterned in the photoresist over the entire top mask layer that covers top surface 17 of the wafer. The etch resistant mask is etched through the patterned photoresist to form identical sets of vias 28A therein, exposing the surface 17 of the silicon wafer 12A through the vias 28. Next, the photoresist layer is removed as shown in FIG. 3C.

Figure 3D:
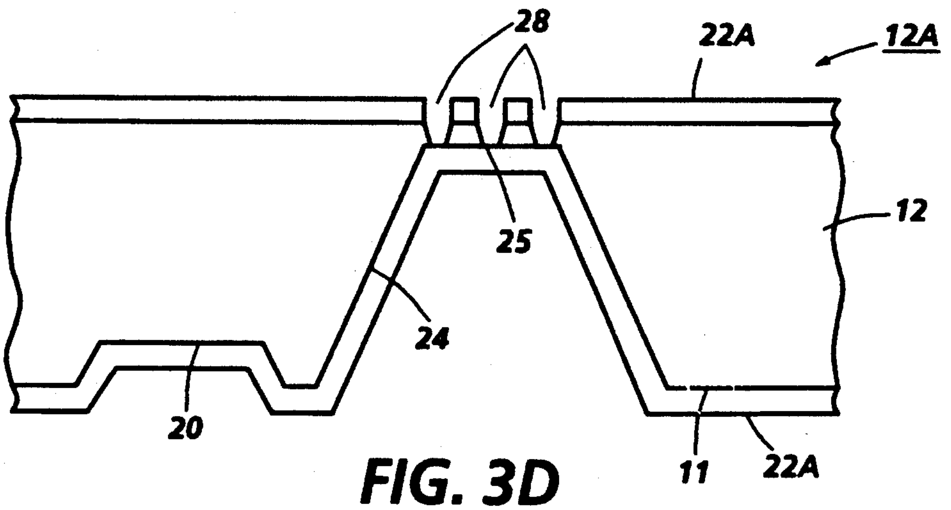
Figure 3E:
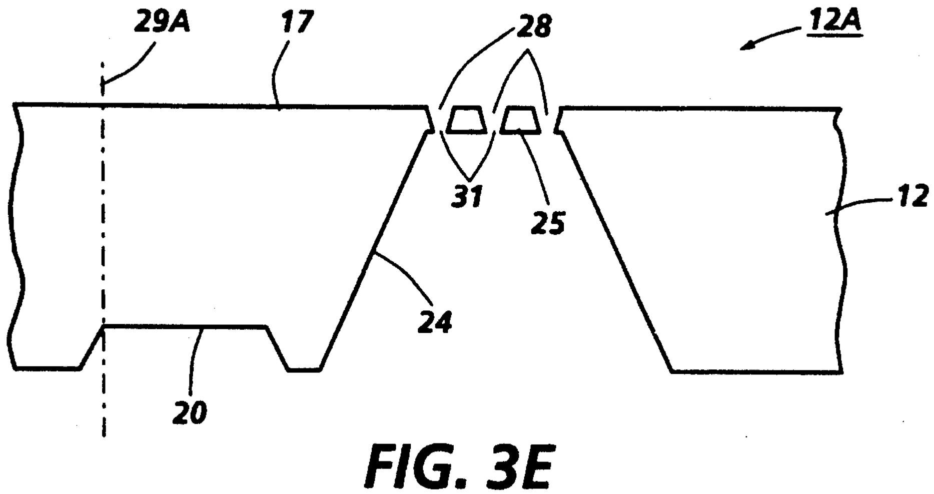

The wafer is anisotropically etched to produce sets of pyramidal recesses 28 which penetrate the reservoir floor and form apertures or holes 31 through the floor 25 of the reservoir recess 24 which is still protected from further etching by the second etch resistant mask layer 22A, as shown in FIG. 3D. The pyramidally shaped holes 28 represent filter pores, thus forming integral filter 14. In FIG. 3E, the etch resistant mask layer 22A has been removed.

For reservoir floor thickness under 25 μm, isotropic etching may be used for the filter pores which permit increased crystal plane alignment latitude, since isotropic etching etches equally in all crystal planes. Further, the under 25 μm, thick reservoir floors also permit reactive ion etching (RIE), but requires the use of an etch mask which is not erodable by the RIE. The advantage of RIE produced filter pores (not shown) is that the walls thereof are more vertical than pyramidal for anisotropically etched holes or hemispheric for isotropically etched holes. Thus, RIE formed pores may be placed on closer center-to-center spacing enabling an increased flow area for faster ink refill of the ink reservoir.

By sealingly attaching an ink supply hose (not shown) to the filter from the channel plate surface 17 later, the filter serves as an inlet with a combined filter, i.e., inlet with an integral filter. The wafer 12A of FIG. 3E is aligned and bonded to the heater wafer as described in U.S. Pat. No. 4,744,530 to Hawkins and diced into a plurality of individual heating elements. By cutting along dicing line 29A, shown in FIG. 3E, the channel ends opposite from the ends adjacent the reservoirs 24 are opened to form nozzle face 29 and nozzles 27, as shown in FIGS. 1 and 2.

Figure 4:
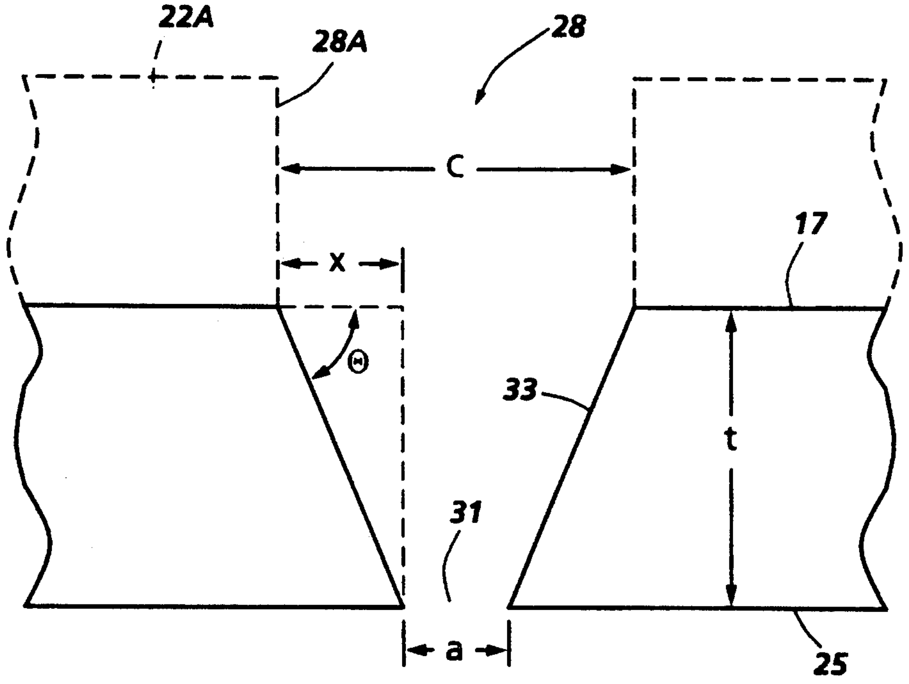
FIG. 4 is a schematic, cross-sectional view of one etched filter pore.

Referring to FIG. 4, the sizes of the pyramidal, anisotropically etched recesses 28 can be varied to accommodate the ink flow demands to replenish the reservoirs. The walls 33 of the anisotropically etched recesses follow the {111} crystal planes of the silicon wafers and therefore have an angle $\theta$ of 54.7° with the 100 crystal plane wafer surface 17. Thus, the openings 31 produced by the etched recess, as it penetrates the reservoir floor, may be adjusted according to the rectangular size "c" of the via 28A in the etch resistant layer 22A and the thickness "t" of the reservoir floor 25. Thus, for a square opening 31, one opening side "a" equals one side "c" of via 28A in the mask minus 2 times the reservoir floor thickness "t" divided by tan $\theta$ or 1.41, where "x" is the dimension loss due to the slope of the {111} crystal planes.

$$a=c-2x \text{ and } \tan\theta=t/x; \text{ therefore, } a=c-2(t/\tan\theta).$$

Many modifications and variations are apparent from the foregoing description of the invention and all such modifications and variations are intended to be within the scope of the present invention.

We claim:

1. An ink jet printhead having an ink inlet with an integral filter to prevent contaminates from entering the printhead either during subsequent fabrication steps or during a printing mode by contaminates entrained in an ink to be used by the printhead comprising:

each having an opposing first surface and second opposing surface, said second substrate being silicon;

the first surface of the first substrate having a linear array of heating elements and associated addressing electrodes formed thereon;

the first surface of the second substrate having an ink reservoir recess with a bottom floor having a thickness of about 5 to 100 μm and having a parallel set of elongated grooves, the grooves having opposing ends, one end being open and the other end being adjacent the reservoir recess, the reservoir recess and the grooves being etched through a patterned layer of first etch resistant material on said first surface of the second substrate, while the second surface thereof is concurrently being prevented from being etched by a layer of first etch resistant material, the reservoir recess floor having a plurality of openings therein for use as an inlet with an integral filter, the plurality of openings in the reservoir recess floor each being less in size than the groove open ends and being produced by etching through a subsequently applied and patterned layer of second etch resistant material on the second surface of the second substrate, while the reservoir recess and set of elongated grooves are prevented from being etched by a layer of second etch resistant material;

the first surface of the first substrate having the heating elements and addressing electrodes being aligned and bonded to the first surface of the second substrate having the reservoir recess and set of grooves, so that each groove serves as an ink channel and has one of the heating elements therein spaced a predetermined distance from the groove open ends, so that the grooves serve as ink channels and the groove open ends serve as droplet emitting nozzles, and the reservoir recess serves as a reservoir for ink from which the channels are filled;

means for placing the grooves into communication with the reservoir recess;

means for providing ink at a predetermined pressure to the reservoir inlet with the integral filter, so that ink travels through the integral filter and is filtered thereby as said ink flows into the reservoir and then into the channels, a meniscus being formed at the nozzles, which, in combination with the predetermined pressure of the ink, prevents ink from weeping therefrom; and means for selectively applying electrical pulses to the heating elements through the addressing electrodes to produce momentary vapor bubbles in the ink in contact with the heating elements which eject ink droplets from the nozzles.

2. The printhead of claim 1, wherein the reservoir recess floor has a thickness of about 25 μm; and wherein the plurality of etched openings in the floor are each about 20×20 μm in size and are on about 50 to 100 μm center-to-center spacing.

3. The printhead of claim 2, wherein the second silicon substrate is a portion of a (100) silicon wafer having a thickness of about 20 mils or 500 μm; wherein the first and second etch resistant material is silicon nitride; and wherein the etching through the patterned silicon nitride is anisotropic.

4. A method of fabricating a plurality of ink jet printheads from a (100) silicon wafer having a top surface and a bottom surface and an electrically insulative or semiconductive, planar wafer-size substrate, each of the printheads having an integral ink inlet filter for use in ink jet printing devices, the method comprising the steps of:

(a) depositing a first layer of etch resistant material on the top and bottom surfaces of a (100) silicon wafer;

(b) applying and patterning a first photoresist layer on the first layer of etch resistant material on the bottom surface of the silicon wafer to produce a pattern of vias therein suitable for subsequent production of vias in the first layer of etch resistant material that will enable etching of a plurality of sets of parallel grooves and at least one associated reservoir recess for each set of grooves;

(c) forming the pattern of vias in the first layer of etch resistant material on the bottom surface of the water through the pattern of vias in the first photoresist layer;

(d) removing the first photoresist layer;

(e) etching the bottom surface of the silicon wafer for a predetermined time period to form the plurality of sets of parallel grooves and associated reservoir recesses, said grooves and reservoir recesses being for subsequent use as sets of channels and associated ink supplying reservoirs, respectively, each reservoir recess having a predetermined depth based upon the predetermined time period for etching the silicon wafer bottom surface thereby defining a floor having a predetermined thickness;

(f) removing the first layer of etch resistant material from the top and bottom surfaces of the wafer;

(g) depositing a second layer of etch resistant material on both the bottom surface containing the plurality of sets of grooves and associated reservoir recesses and the top surface of the wafer;

(h) applying and patterning a second photoresist layer on the second layer of etch resistant material on the top surface of the wafer to produce a plurality of vias therein having equal predetermined sizes suitable for subsequent production of vias in the second layer of etch resistant material that will enable etching of recesses in the top surface of the wafer having a depth greater than the thickness of the reservoir recess floor;

(i) forming a plurality of vias in the second layer of etch resistant material on the top surface of the wafer through the pattern of vias in the second photoresist layer, said vias in the second layer of etch resistant material being of predetermined equal size and spacing, and exposing the top surface of the wafer through said vias in the second layer of etch resistant material on the top surface of the wafer;

(j) removing the second layer of photoresist;

(k) etching the wafer through the vias in the second layer of the etch resistant material to form a plurality of uniformly spaced recesses having a depth larger than the reservoir floor thickness, so that those in alignment therewith form apertures through each of the reservoir recess floors, each aperture having an equal predetermined size, so that the apertures may serve subsequently as pores of filters integral with an ink inlet in each of a respective one of the reservoir recesses;

(l) removing the second layer of etch resistant material from the top and bottom surfaces of the wafer;

(m) forming a linear array of heating elements and addressing electrodes on the top surface of an electrically insulative or semiconductive planar, wafer-size substrate, the addressing electrodes enabling the individual, selective application of electrical pulses to the heating elements;

(n) aligning and bonding the bottom surface of the silicon wafer having the channel grooves and reservoir recesses with the top surface of the planar substrate having the heating elements, so that each groove forms an ink channel and contains a heating element therein and each reservoir recess forms an ink reservoir, the integral filters preventing entry of contaminating particles into the reservoirs which are larger than the filter apertures during subsequent fabrication steps; and (o) dicing the mated wafer and substrate into a plurality of individual printheads, one of the dicing cuts being along planes perpendicular to the channels and a predetermined distance downstream from the heating elements to produce channel open ends that will serve as nozzles, ink supplied to the printhead reservoir being filtered by the filter integral with the ink inlet prior to entry therein.

5. The fabrication method of claim 4, wherein the method further comprises the step of:

(p) after step (m), depositing and patterning a thick film polymeric layer over the heating elements and addressing electrodes having a predetermined thickness, so that the thick film layer is removed over each heating element, thus placing the heating elements in pits, and trenches are produced at predetermined locations to provide the means for communication between the channels and the reservoirs at the conclusion of step (n).

6. The fabrication method of claim 4, wherein the etching in step (k) is accomplished in an anisotropic etchant bath.

7. The fabrication method of claim 4, wherein the etching in step (k) is accomplished in an isotropic etchant bath.

8. The fabrication method of claim 4, wherein te etching in step (k) is accomplished by reactive ion etching (RIE).

9. The fabrication method of claim 4, wherein the patterning of the second photoresist layer in step (h) and the subsequent patterning of vias in the second layer of etch resistant material on the top surface of the wafer in step (i) is only in areas in alignment with the reservoir recesses in the bottom surface of the wafer.

10. The fabrication method of claim 4, wherein the patterning of the second photoresist layer in step (h) and the subsequent patterning of the vias in the second layer of etch resistant material on the top surface of the wafer in step (i) is a continuous array of vias covering the entire top surface of the wafer, in order to avoid the need to precisely align the vias with the individual reservoir recesses, thus producing apertures in the floors of the reservoir recesses when said vias confront the reservoir recesses and producing relatively shallow recesses across the rest of the top surface of the wafer.

* * * * *